US012559173B2

(12) United States Patent
Zhang et al.

(10) Patent No.: US 12,559,173 B2
(45) Date of Patent: Feb. 24, 2026

(54) FOUR-WHEEL STEERING CONTROL SYSTEM AND CONTROL METHOD THEREFOR

(71) Applicant: Lingong Heavy Machinery Co., Ltd., Shandong (CN)

(72) Inventors: Zhaolliang Zhang, Shandong (CN); Shaolei Li, Shandong (CN); Dehong Wang, Shandong (CN); Desen Xue, Shandong (CN); Zengzhi Zhao, Shandong (CN); Xiaofei Deng, Shandong (CN); Bing Guo, Shandong (CN)

(73) Assignee: Lingong Heavy Machinery Co., Ltd., Shandong (CN)

( * ) Notice: Subject to any disclaimer, the term of this patent is extended or adjusted under 35 U.S.C. 154(b) by 387 days.

(21) Appl. No.: 18/032,033

(22) PCT Filed: Nov. 29, 2022

(86) PCT No.: PCT/CN2022/134980
§ 371 (c)(1),
(2) Date: Apr. 14, 2023

(87) PCT Pub. No.: WO2023/202080
PCT Pub. Date: Oct. 26, 2023

(65) Prior Publication Data
US 2024/0367718 A1 Nov. 7, 2024

(30) Foreign Application Priority Data
Apr. 19, 2022 (CN) .......................... 202210407581.5

(51) Int. Cl.
| | |
|---|---|
| *B62D 9/00* | (2006.01) |
| *B62D 5/08* | (2006.01) |
| *B62D 5/093* | (2006.01) |

(52) U.S. Cl.
CPC ................. *B62D 9/00* (2013.01); *B62D 5/08* (2013.01); *B62D 5/093* (2013.01)

(58) Field of Classification Search
CPC . B62D 9/00; B62D 5/08; B62D 5/093; B62D 5/06; B62D 7/1509; B62D 5/061; B62D 5/18
See application file for complete search history.

(56) References Cited

U.S. PATENT DOCUMENTS 7,571,786 B2 * 8/2009 Kawashima ......... B62D 7/1509
180/414

FOREIGN PATENT DOCUMENTS

| CN | 103661599 A | 3/2014 |
|---|---|---|
| CN | 203974931 U | 12/2014 |

(Continued)

OTHER PUBLICATIONS

English translation of WO-2020199526.*
Office Action for priority Chinese Application No. 202210407581.5.

*Primary Examiner* — Joseph J Dallo
(74) *Attorney, Agent, or Firm* — Wood, Phillips, Katz, Clark & Mortimer

(57) ABSTRACT

A The four-wheel steering control system includes a front drive axle, a front drive cylinder, a rear drive axle, a rear drive cylinder, a first reversing valve, a second reversing valve, and a switch valve. The front drive cylinder is drivingly connected to the front drive axle, and the rear drive cylinder is drivingly connected to the rear drive axle. A first working oil port of the first reversing valve communicates with one oil chamber of the front drive cylinder. A second working oil port of the first reversing valve communicates with an oil inlet of the second reversing valve. An oil return port of the second reversing valve communicates with another oil chamber of the front drive cylinder. Two working (Continued)

oil ports of the second reversing valve communicate with two oil chambers of the rear drive cylinder one to one.

11 Claims, 4 Drawing Sheets

(56)            References Cited

FOREIGN PATENT DOCUMENTS

| | | | | | |
|---|---|---|---|---|---|
| CN | 107433975 | A | | 12/2017 | |
| CN | 107813870 | A | | 3/2018 | |
| CN | 108891481 | A | | 11/2018 | |
| CN | 110109463 | A | | 8/2019 | |
| CN | 110861708 | A | | 3/2020 | |
| CN | 111688803 | A | | 9/2020 | |
| CN | 212738266 | U | | 3/2021 | |
| CN | 113386853 | A | * | 9/2021 | ............. B62D 5/062 |
| CN | 113942574 | A | | 1/2022 | |
| CN | 114506384 | A | * | 5/2022 | .............. B62D 5/18 |
| CN | 114506384 | B | * | 7/2022 | .............. B62D 5/08 |
| CN | 113386853 | B | * | 10/2022 | .............. B62D 5/20 |
| CN | 116890908 | A | * | 10/2023 | ............. B62D 5/062 |
| EP | 1820715 | A1 | * | 8/2007 | .......... B62D 7/1509 |
| JP | H06171525 | A | | 6/1994 | |
| JP | H0717417 | A | | 1/1995 | |
| JP | 2004284522 | A | | 10/2004 | |
| WO | WO-2017137302 | A1 | * | 8/2017 | .............. B60T 15/20 |
| WO | WO-2020199526 | A1 | * | 10/2020 | .............. B62D 5/06 |

* cited by examiner

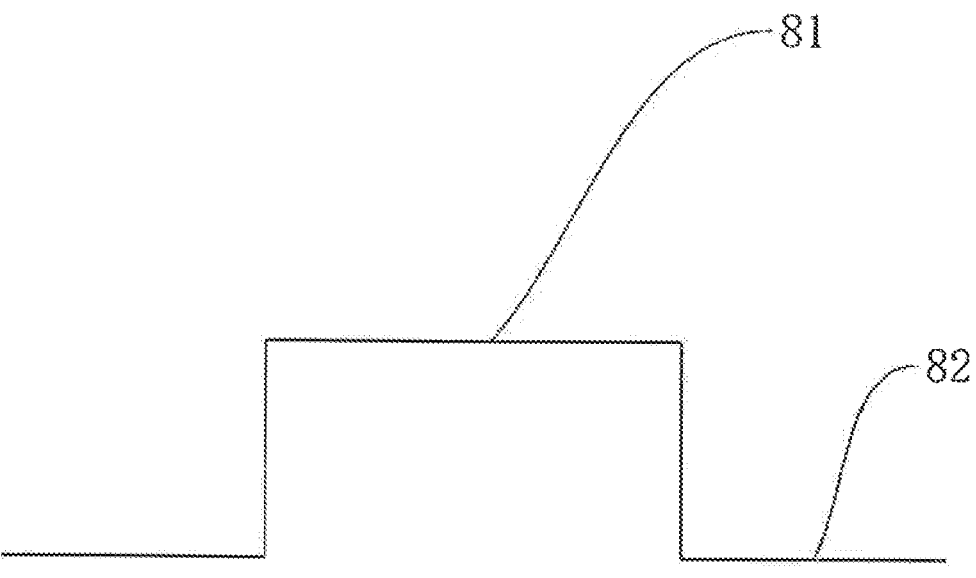

FIG. 2

In a front-wheel steering mode, control the first reversing valve to switch to a first work position, the second reversing valve to maintain a middle position, and the switch valve to maintain a closed position, so as to drive front wheels to steer in a first direction; or control the first reversing valve to switch to a second work position, the second reversing valve to maintain the middle position, and the switch valve to maintain the closed position, so as to drive the front wheels to steer in a second direction In a rear-wheel steering mode, control the first reversing valve to switch to the second work position, the second reversing valve to switch to a second work position, and the switch valve to switch to a conduction position, so as to drive rear wheels to steer in the first direction; or control the first reversing valve to switch to the second work position, the second reversing valve to switch to a first work position, and the switch valve to switch to the conduction position, so as to drive the rear wheels to steer in the second direction

FIG. 3

FOUR-WHEEL STEERING CONTROL SYSTEM AND CONTROL METHOD THEREFOR

CROSS-REFERENCE TO RELATED APPLICATION(S)

This is a national stage application filed under 35 U.S.C. 371 based on International Patent Application No. PCT/CN2022/134980, filed Nov. 29, 2022, which claims priority to Chinese Patent Application No. 202210407581.5 filed on Apr. 19, 2022, the disclosures of which are incorporated herein by reference in their entireties.

TECHNICAL FIELD

The present application relates to the technical field of four-wheel drive, for example, a four-wheel steering control system and a control method therefor.

BACKGROUND

With rapid development, construction sites, large or small, are spread throughout the country, and construction machinery is springing up. Due to different construction conditions on construction sites and relatively harsh environments, vehicle circulation construction is more suitable in narrow and complicated places with much debris. Therefore, the four-wheel steering technology emerged and is applied in a wider range of fields.

In the related art, vehicles only feature a front-wheel steering mode, a four-wheel steering mode, and a crab steering mode. The rear wheels of the vehicles cannot realize independent steering control, leading to poor driving flexibility.

SUMMARY

The present application provides a four-wheel steering control system and a control method therefor.

In one aspect, an embodiment of the present application provides a four-wheel steering control system, including a front drive axle, a front drive cylinder, a rear drive axle, a rear drive cylinder, a first reversing valve, a second reversing valve, and a switch valve.

The front drive cylinder is drivingly connected to the front drive axle. The rear drive cylinder is drivingly connected to the rear drive axle. A first working oil port of the first reversing valve communicates with one oil chamber of the front drive cylinder. A second working oil port of the first reversing valve communicates with an oil inlet of the second reversing valve. An oil return port of the second reversing valve communicates with another oil chamber of the front drive cylinder. Two working oil ports of the second reversing valve communicate with two oil chambers of the rear drive cylinder one to one. The oil return port of the second reversing valve communicates with an oil tank through the switch valve.

In another aspect, an embodiment of the present application provides a control method for a four-wheel steering control system, which is applied to any one of the four-wheel steering control systems described above. The control method includes the operations described below.

In a front-wheel steering mode, the first reversing valve is controlled to switch to a first work position, the second reversing valve is controlled to maintain a middle position, and the switch valve is controlled to maintain a closed position, so as to drive front wheels to steer in a first direction; or the first reversing valve is controlled to switch to a second work position, the second reversing valve is controlled to maintain the middle position, and the switch valve is controlled to maintain the closed position, so as to drive the front wheels to steer in a second direction.

In a rear-wheel steering mode, the first reversing valve is controlled to switch to the second work position, the second reversing valve is controlled to switch to a second work position, and the switch valve is controlled to switch to a conduction position, so as to drive rear wheels to steer in the first direction; or the first reversing valve is controlled to switch to the second work position, the second reversing valve is controlled to switch to a first work position, and the switch valve is controlled to switch to the conduction position, so as to drive the rear wheels to steer in the second direction.

BRIEF DESCRIPTION OF DRAWINGS

FIG. 2 is a diagram of a signal jump of a detection member according to an embodiment of the present application.

FIG. 3 is a flowchart of the control method for the four-wheel steering control system according to an embodiment of the present application.

Figure 1:
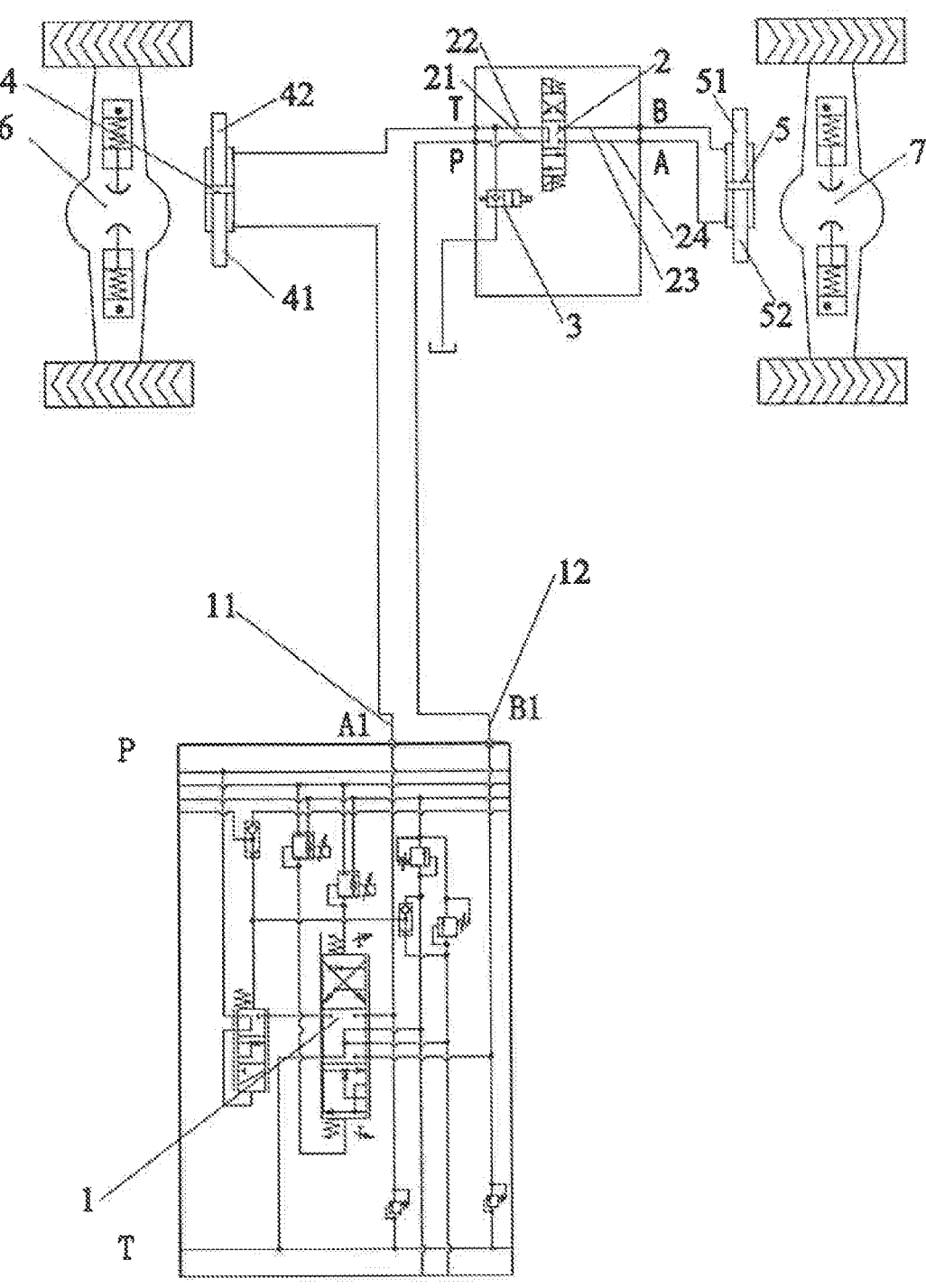
FIG. 1 is a diagram of a four-wheel steering control system according to an embodiment of the present application.

REFERENCE LIST 1 first reversing valve
11 first working oil port
12 second working oil port
2 second reversing valve
21 oil inlet
22 oil return port
23 third working oil port
24 fourth working oil port
3 switch valve
4 front drive cylinder
41 first oil chamber
42 second oil chamber
5 rear drive cylinder
51 third oil chamber
52 fourth oil chamber
6 front drive axle
7 rear drive axle
81 first signal
82 second signal
9 detection member
10 controller
11 trigger switch

DETAILED DESCRIPTION

In the description of the present application, unless otherwise expressly specified and limited, a term "connected to each other", "connected" or "secured" is to be construed in a broad sense, for example, as securely connected, detachably connected, or integrated; mechanically connected or electrically connected; directly connected to each other or indirectly connected to each other via an intermediary; or internally connected between two components or interaction relations between two components. For those of ordinary skill in the art, specific meanings of the preceding terms in the present application may be construed according to specific situations.

In the present application, unless otherwise expressly specified and limited, when a first feature is described as "above" or "below" a second feature, the first feature and the second feature may be in direct contact or be in contact via another feature between the two features instead of being in direct contact. Moreover, when the first feature is "on", "above", or "over" the second feature, the first feature is right on, above, or over the second feature, or the first feature is obliquely on, above, or over the second feature, or the first feature is simply at a higher level than the second feature. When the first feature is "under", "below", or "underneath" the second feature, the first feature is right under, below; or underneath the second feature, or the first feature is obliquely under, below; or underneath the second feature, or the first feature is simply at a lower level than the second feature.

In the description of the embodiments, it is to be noted that orientations or position relations indicated by terms such as "above", "below", "left" and "right" are based on the drawings. These orientations or position relations are intended only to facilitate the description and simplify an operation and not to indicate or imply that a device or element referred to must have such particular orientations or must be configured or operated in such particular orientations. Thus, these orientations or position relations are not to be construed as limiting the present application. In addition, terms "first" and "second" are used only to distinguish between descriptions and have no special meaning.

Figure 4:
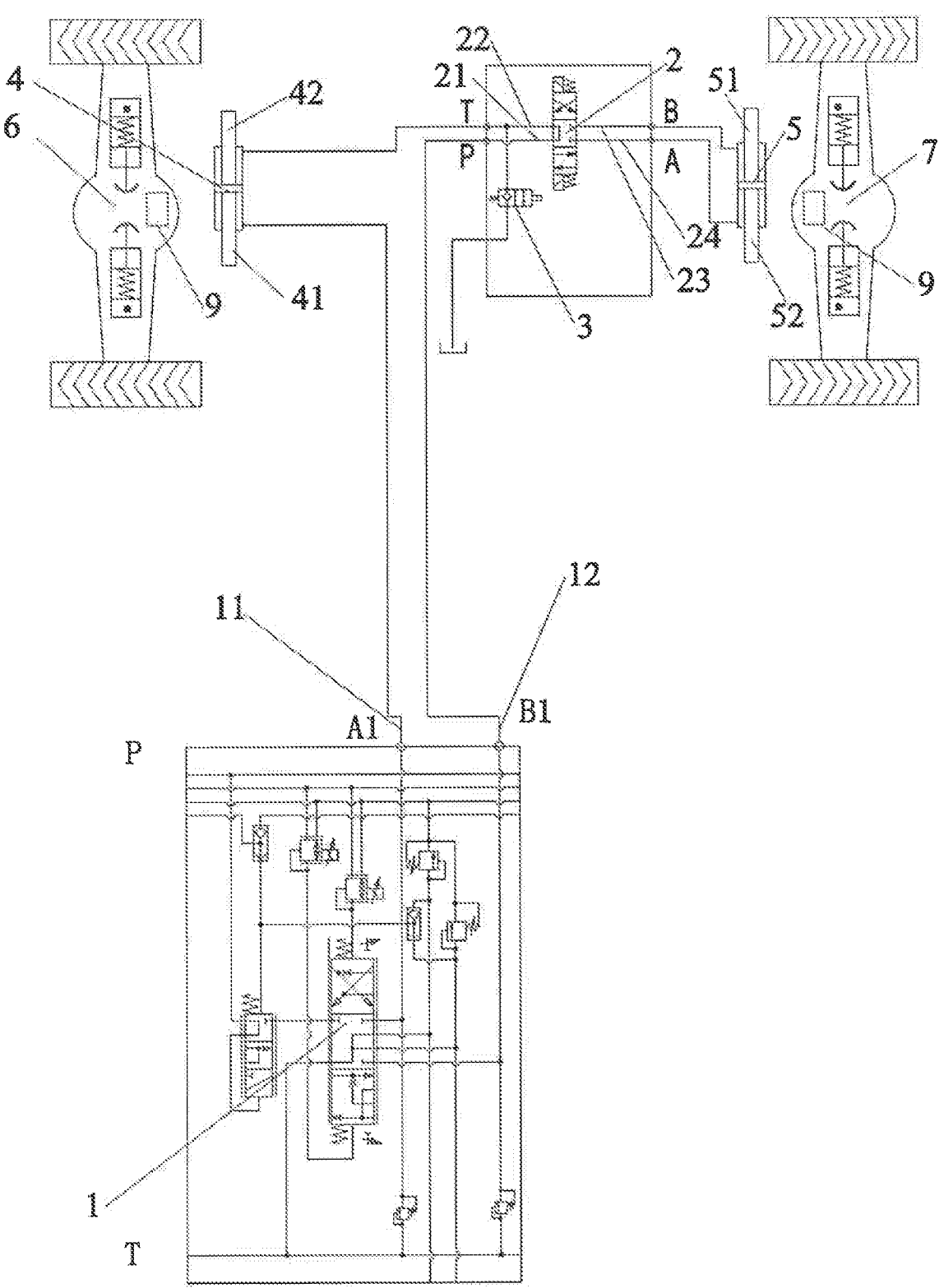
FIG. 4 is a diagram of a four-wheel steering control system according to an embodiment of the present application.

As shown in FIG. 1 and FIG. 4, this embodiment provides a four-wheel steering control system, including a front drive axle 6, a front drive cylinder 4, a rear drive axle 7, a rear drive cylinder 5, a first reversing valve 1, a second reversing valve 2, and a switch valve 3.

In an embodiment, the front drive cylinder 4 is drivingly connected to the front drive axle 6, and the rear drive cylinder 5 is drivingly connected to the rear drive axle 7. A first working oil port 11 of the first reversing valve 1 communicates with one oil chamber of the front drive cylinder 4. A second working oil port 12 of the first reversing valve 1 communicates with an oil inlet 21 of the second reversing valve 2. An oil return port 22 of the second reversing valve 2 communicates with another oil chamber of the front drive cylinder 4. Two working oil ports of the second reversing valve 2 communicate with two oil chambers of the rear drive cylinder 5 one to one. The oil return port 22 of the second reversing valve 2 communicates with an oil tank through the switch valve 3.

In this embodiment, the front drive cylinder 4 includes a first oil chamber 41 and a second oil chamber 42. The first working oil port 11 communicates with the first oil chamber 41, and the oil return port 22 of the second reversing valve 2 communicates with the second oil chamber 42. When the first oil chamber 41 receives oil and the second oil chamber 42 discharges oil, front wheels steer in a first direction. When the second oil chamber 42 receives oil and the first oil chamber 41 discharges oil, the front wheels steer in a second direction. The rear drive cylinder 5 includes a third oil chamber 51 and a fourth oil chamber 52. The two working oil ports of the second reversing valve 2 are a third working oil port 23 and a fourth working oil port 24. The third working oil port 23 is connected to the third oil chamber 51, and the fourth working oil port 24 is connected to the fourth oil chamber 52. When the third oil chamber 51 receives oil and the fourth oil chamber 52 discharges oil, rear wheels steer in the first direction. When the fourth oil chamber 52 receives oil and the third oil chamber 51 discharges oil, the rear wheels steer in the second direction.

When in operation, the first reversing valve 1 is controlled to switch to a second work position, the second reversing valve 2 is controlled to switch to a second work position, and the valve 3 is controlled to switch to a conduction position, the oil flows into the third oil chamber 51 of the rear drive cylinder 5 through the first reversing valve 1 and the second reversing valve 2 to drive the rear wheels to steer in the first direction. When the first reversing valve 1 is controlled to switch to the second work position, the second reversing valve 2 is controlled to switch to a first work position, and the switch valve 3 is controlled to switch to the conduction position, the oil flows into the fourth oil chamber 52 of the rear drive cylinder 5 through the first reversing valve 1 and the second reversing valve 2 to drive the rear wheels to steer in the second direction. And when the rear drive cylinder 5 drives the rear wheels to steer directions, the oil which returns to the rear drive cylinder 5 flows into the oil tank through the second reversing valve 2 and the switch valve 3. This embodiment realizes independent steering control of the rear wheels of vehicles, improves driving flexibility, meets various working conditions, and facilitates the drive of the rear wheels for independent centering.

In related technologies, to adapt to different working conditions, axle-driven electric boom lift cars have been added a four-wheel steering mode and a crab steering mode on the basis of the commonly used two-wheel steering mode. However, the switching of different steering modes is completely through hydraulic pressure, and the electronic control system simply controls the on-off of the switch valve 3. When different switch valves 3 are combined, the hydraulic system can realize different steering modes according to different combinations of on-off of the switch valves 3. In related technologies, a rotation-angle sensor is configured for each steering wheel to facilitate the control of the steering mode. The electronic control system controls the steering direction of each wheel according to the angular position of each wheel. In this manner, two-wheel steering, four-wheel steering, and crab steering can be realized. When the steering wheels are in chaos, the electronic control system can realize automatic centering according to the angular position of each wheel. However, the four-wheel steering control system of this embodiment has no usable rotation-angle sensor, so when the steering wheels are in chaos, automatic centering is not achieved according to the angular positions of the steering wheels.

To solve the above-mentioned problem, the four-wheel steering control system also includes two detection members 9 which are disposed on the front drive axle 6 and the rear drive axle 7 respectively and are configured to detect position states of front wheels and rear wheels respectively. The position states include a middle position, a left side of the middle position, and a right side of the middle position. When at least one of the front wheels or the rear wheels is in a middle position, the detection members 9 output a first signal 81; when at least one of the front wheels or the rear wheels is not in a middle position, the detection members 9 output a second signal 82. When the detection members 9 are in operation, the position states of the wheels are determined and recorded according to a steering direction of the wheels when the first signal 81 and the second signal 82 are switched in the previous action. It should be noted that the preceding wheels include front wheels and rear wheels, and wheels are a general term for front wheels and rear wheels.

In this embodiment, as shown in FIG. 2, detection members 9 are centering switches. One of the first signal 81 or the second signal 82 is a high-level signal, and another one of the first signal 81 or the second signal 82 is a low-level signal.

Figure 5:
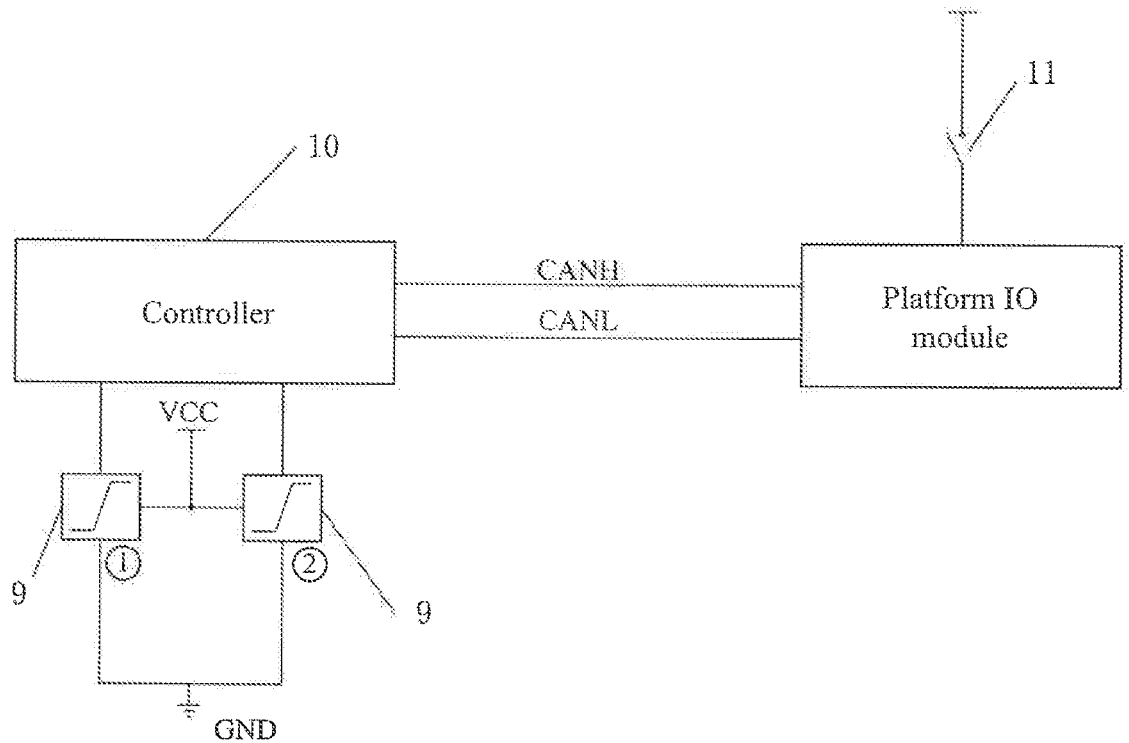
FIG. 5 is a circuit diagram of a four-wheel steering control system according to an embodiment of the present application.

In an embodiment, as shown in FIG. 5, the four-wheel steering control system also includes a trigger switch 11 configured to control the front wheels and the rear wheels to steer to a middle position.

In this embodiment, the first reversing valve 1, the second reversing valve 2, and the switch valve 3 are electromagnetic valves, which are controlled by a controller 10.

The first reversing valve 1 is a three-position six-way reversing valve, including a first work position, a second work position, and a third work position. When the first reversing valve 1 is in the first work position, oil flows out through the first working oil port 11 and returns to the second working oil port 12. When the first reversing valve 1 is in the second work position, the oil flows out through the second working oil port 12 and returns to the first working oil port 11. When the first reversing valve 1 is in the third work position, the first working oil port 11 and the second working oil port 12 are blocked separately, and the four-wheel steering control system does not work at this time.

The second reversing valve 2 is a three-position four-way reversing valve, including a first work position, a second work position, and a middle position. When the second reversing valve 2 is in the second work position, the oil inlet 21 communicates with the third working oil port 23, and the oil return port 22 communicates with the fourth working oil port 24. When the second reversing valve 2 is in the first work position, the oil inlet 21 communicates with the fourth working oil port 24, and the oil return port 22 communicates with the third working oil port 23. When the second reversing valve 2 is in the middle position, the oil inlet 21 communicates with the oil return port 22.

The switch valve 3 is a two-position two-way reversing valve, including a conduction position and a closed position. When the switch valve 3 is in the conduction position, the oil return port 22 of the second reversing valve 2 communicates with the oil tank. When the switch valve 3 is in the closed position, the oil return port 22 of the second reversing valve 2 and the oil tank are cut off.

As shown in FIG. 3, this embodiment also provides a control method for a four-wheel steering control system which is applied to the four-wheel steering control systems described above. The control method includes a front-wheel steering mode, a rear-wheel steering mode, a four-wheel steering mode, and a crab steering mode, which improves the flexibility of the four-wheel steering control system.

In an embodiment, in the front-wheel steering mode, the first reversing valve 1 is controlled to switch to a first work position, the second reversing valve 2 is controlled to maintain in a middle position, and the switch valve 3 is controlled to maintain in a closed position. In this manner, the oil flows into the first oil chamber 41 of the front drive cylinder 4 through the first working oil port 11 of the first reversing valve 1 to drive the front wheels to steer in a first direction, and then the oil flows out through the second oil chamber 42 of the front drive cylinder 4 and flows back to the second working oil port 12 of the first reversing valve 1 through the second reversing valve 2. Or the first reversing valve 1 is controlled to switch to a second work position, the second reversing valve 2 maintains in the middle position, and the switch valve 3 is controlled to maintain in the closed position. In this manner, the oil flows into the second oil chamber 42 of the front drive cylinder 4 through the first reversing valve 1 and the second reversing valve 2 to drive the front wheels to steer in a second direction, and then the oil flows out through the first oil chamber 41 of the front drive cylinder 4 and flows back to the first working oil port 11 of the first reversing valve 1, thus realizing the independent drive of the front wheels.

In the rear-wheel steering mode, the first reversing valve 1 is controlled to switch to the second work position, the second reversing valve 2 is controlled to switch to a second work position, and the switch valve 3 is controlled to switch to a conduction position. In this manner, the oil flows into the third oil chamber 51 of the rear drive cylinder 5 through the first reversing valve 1 and the second reversing valve 2 to drive rear wheels to steer in the first direction, and then the oil flows out through the fourth oil chamber 52 of the rear drive oil cylinder 5 and flows into the oil tank through the second reversing valve 2 and the switch valve 3. Or the first reversing valve 1 is controlled to switch to the second work position, the second reversing valve 2 is controlled to switch to a first work position, and the switch valve 3 is controlled to switch to a conduction position. In this manner, the oil flows into the fourth oil chamber 52 of the rear drive cylinder 5 through the first reversing valve 1 and the second reversing valve 2 to drive the rear wheels to steer in the second direction, and then the oil flows out through the third oil chamber 51 of the rear drive cylinder 5 and flows into the oil tank through the second reversing valve 2 and the switch valve 3. When the rear drive cylinder 5 drives the rear wheels to steer directions, the oil which returns to the rear drive cylinder 5 flows into the oil tank through the second reversing valve 2 and the switch valve 3, thereby realizing the independent drive of the rear wheels.

In the crab steering mode, the first reversing valve 1 is controlled to switch to the second work position, the second reversing valve 2 is controlled to switch to the first work position, and the switch valve 3 is controlled to maintain the closed position. In this manner, the oil flows into the fourth oil chamber 52 of the rear drive cylinder 5 through the first reversing valve 1 and the second reversing valve 2, and then the oil flows out through the third oil chamber 51 of the rear drive oil cylinder 5 and flows into the second oil chamber 42 of the front drive oil cylinder 4 through the second reversing valve 2 to drive the front wheels and the rear wheels to steer in the second direction simultaneously, and then the oil flows out through the first oil chamber 41 of the front drive cylinder 4 and flows into the first working oil port 11 of the first reversing valve 1. Or the first reversing valve 1 is controlled to switch to the first work position, the second reversing valve 2 is controlled to switch to the first work position, and the switch valve 3 is controlled to maintain the closed position. In this manner, the oil flows into the first oil chamber 41 of the front drive cylinder 4 through the first reversing valve 1, and then the oil flows out from the second oil chamber 42 of the front drive cylinder 4 and flows into the third oil chamber 51 of the rear drive cylinder 5 through the second reversing valve 2 to drive the front wheels and the rear wheels to steer in the first direction simultaneously, and then the oil flows out of the fourth oil chamber 52 of the rear drive oil cylinder 5 and flows into the second working oil port 12 of the first reversing valve 1 through the second reversing valve 2 so that the front wheels and the rear wheels can steer in the same direction at the same time.

In the four-wheel steering mode, the first reversing valve 1 is controlled to switch to the second work position, the second reversing valve 2 is controlled to switch to the second work position, and the switch valve 3 is controlled to maintain the closed position. In this manner, the oil flows into the third oil chamber 51 of the rear driving cylinder 5 through the first reversing valve 1 and the second reversing valve 2, and then the oil flows out through the fourth oil chamber 52 of the rear drive cylinder 5 and flows into the second oil chamber 42 of the front drive cylinder 4 through the second reversing valve 2 to drive the front wheels to steer in the second direction and the rear wheels to steer in the first direction simultaneously, and then the oil flows out of the first oil chamber 41 of the front drive cylinder 4 and flows into the first working oil port 11 of the reversing valve 1. Or the first reversing valve 1 is controlled to switch to the first work position, the second reversing valve 2 is controlled to switch to the second work position, and the switch valve 3 is controlled to maintain the closed position. In this manner, the oil flows into the first oil chamber 41 of the front drive cylinder 4 through the first reversing valve 1, and then the oil flows out through the second oil chamber 42 of the front drive cylinder 4 and flows into the fourth oil chamber 52 of the rear drive cylinder 5 through the second reversing valve 2 to drive the front wheels to steer in the first direction and the rear wheels to steer in the second direction simultaneously, and then the oil flows out through the third oil chamber 51 of the rear drive oil cylinder 5 and flows into the second working oil port 12 of the first reversing valve 1 through the second reversing valve 2 so that the front wheels and the rear wheels are steered simultaneously in opposite directions.

To prevent safety accidents caused by misjudgment when the front wheels and rear wheels are not in a centered state, in an embodiment, detection members 9 are disposed on the front drive axle 6 and the rear drive axle 7 respectively and are configured to detect position states of the front wheels and the rear wheels. A controller 10 is configured to receive a detection signal from the detection members 9 and control the steering of the front wheels and the rear wheels according to the detection signal so that at least one of the front wheels or the rear wheels is centered. The front-wheel centering is driven by the front-wheel steering mode, and the rear-wheel centering is driven by the rear-wheel steering mode.

In an embodiment, when at least one of the front wheels or the rear wheels is in a middle position, the detection members 9 output a first signal 81; and when at least one of the front wheels or the rear wheels is not in a middle position, the detection members output a second signal 82. The step of detecting the position states includes determining and recording the position states of the wheels according to a steering direction of the wheels when the first signal 81 and the second signal 82 are switched in the previous action. In this embodiment, the detection member 9 is a centering switch whose first signal 81 is a high-level signal and whose second signal 82 is a low-level signal. From being untriggered to being triggered, the signal of the centering switch jumps from low level to high level, which is called a rising edge; and from being triggered to being untriggered, the signal of the centering switch jumps from high level to low level, which is called a falling edge.

When the steering is manually operated, no matter whether the steering relationship of the front wheels or the rear wheels is chaotic, the electromagnetic valve controlling the wheels enables the wheels to steer in the correct direction under the control of the controller 10. When the drive-axle moves from an uncentered state to a centered state or from a centered state to an uncentered state, the centering switch has a signal jump, that is, a rising edge or a falling edge happens. In this case, the controller 10 can judge whether the current wheels turn to the right or the left according to the direction of motion of the wheels (turn left or right) and the jump of the centering switch and permanently save the position of the wheels so that even if powered off at this time, the controller 10 still knows the position states of the wheels before the power failure when the controller 10 is powered on again.

When an operator toggles the trigger switch 11, the controller 10 controls the action of the corresponding electromagnetic valve according to the position of the wheels at this time so that the wheels move toward the middle position in sequence. When the signal of the centering switch collected by the controller 10 becomes high level, the steering is stopped immediately to complete the automatic centering.

In this embodiment, the position states of the wheels are judged by using the signal jump of the centering switch and the steering direction. To provide the controller 10 with the position information of the wheels, an operator simply needs to toggle the automatic centering trigger switch 11 on the controller 10. The controller 10 automatically controls the wheels to start turning toward the middle position to realize the automatic centering of the wheels. At the same time, it is necessary to reasonably configure the steering speed of the wheels during the automatic centering to ensure that the wheels can stop in time when moving to the middle position, thereby realizing automatic centering.

It should be noted that the controller 10 in this embodiment is an electronic control unit (ECU).

What is claimed is:

1. A four-wheel steering control system, comprising:
a front drive axle and a front drive cylinder, wherein the front drive cylinder is drivingly connected to the front drive axle;
a rear drive axle and a rear drive cylinder, wherein the rear drive cylinder is drivingly connected to the rear drive axle;
a first reversing valve and a second reversing valve, wherein a first working oil port of the first reversing valve communicates with one oil chamber of the front drive cylinder, a second working oil port of the first reversing valve communicates with an oil inlet of the second reversing valve, an oil return port of the second reversing valve communicates with another oil chamber of the front drive cylinder, and two working oil ports of the second reversing valve communicate with two oil chambers of the rear drive cylinder one to one;
a switch valve, wherein the oil return port of the second reversing valve communicates with an oil tank through the switch valve; and
a first detection member and a second detection member which are disposed on the front drive axle and the rear drive axle respectively and are configured to detect position states of front wheels and rear wheels respectively, wherein the position states comprise a middle position, a left side of the middle position, and a right side of the middle position; the first detection member is configured to output a first signal in response to the front wheels being in the middle position, and the second detection member is configured to output a first signal in response to the rear wheels being in the middle position; and the first detection member is configured to output a second signal in response to at least one of the front wheels being not in the middle position, and the second detection member is configured to output a second signal in response to at least one of the rear wheels being not in the middle position.

2. The four-wheel steering control system of claim 1, wherein the first detection member and the second detection member are centering switches, one of the first signal or the second signal is a high-level signal, and another one of the first signal or the second signal is a low-level signal.

3. The four-wheel steering control system of claim 1, wherein the first reversing valve is a three-position six-way reversing valve.

4. The four-wheel steering control system of claim 1, wherein the second reversing valve is a three-position four-way reversing valve, and the switch valve is a two-position two-way reversing valve.

5. The four-wheel steering control system of claim 1, further comprising a trigger switch configured to control the front wheels and the rear wheels to steer to the middle position.

6. A control method for a four-wheel steering control system, the method being applied to a four-wheel steering control system that comprises:

a front drive axle and a front drive cylinder, wherein the front drive cylinder is drivingly connected to the front drive axle;

a rear drive axle and a rear drive cylinder, wherein the rear drive cylinder is drivingly connected to the rear drive axle;

a first reversing valve and a second reversing valve, wherein a first working oil port of the first reversing valve communicates with one oil chamber of the front drive cylinder, a second working oil port of the first reversing valve communicates with an oil inlet of the second reversing valve, an oil return port of the second reversing valve communicates with another oil chamber of the front drive cylinder, and two working oil ports of the second reversing valve communicate with two oil chambers of the rear drive cylinder one to one;

a switch valve, wherein the oil return port of the second reversing valve communicates with an oil tank through the switch valve; and a first detection member and a second detection member which are disposed on the front drive axle and the rear drive axle respectively and are configured to detect position states of front wheels and rear wheels respectively, wherein the position states comprise a middle position, a left side of the middle position, and a right side of the middle position; the first detection member is configured to output a first signal in response to the front wheels being in the middle position, and the second detection member is configured to output a first signal in response to the rear wheels being in the middle position; and the first detection member is configured to output a second signal in response to at least one of the front wheels being not in the middle position, and the second detection member is configured to output a second signal in response to at least one of the rear wheels being not in the middle position; and the method comprising:

in a front-wheel steering mode, controlling the first reversing valve to switch to a first work position, the second reversing valve to maintain a middle position, and the switch valve to maintain a closed position, so as to drive front wheels to steer in a first direction; or controlling the first reversing valve to switch to a second work position, the second reversing valve to maintain the middle position, and the switch valve to maintain the closed position, so as to drive the front wheels to steer in a second direction; and in a rear-wheel steering mode, controlling the first reversing valve to switch to the second work position, the second reversing valve to switch to a second work position, and the switch valve to switch to a conduction position, so as to drive rear wheels to steer in the first direction; or controlling the first reversing valve to switch to the second work position, the second reversing valve to switch to a first work position, and the switch valve to switch to the conduction position, so as to drive the rear wheels to steer in the second direction.

7. The control method of claim 6, further comprising:

in a crab steering mode, controlling the first reversing valve to switch to the second work position, the second reversing valve to switch to the first work position, and the switch valve to maintain the closed position, so as to drive the front wheels and the rear wheels to steer in the second direction simultaneously; or controlling the first reversing valve to switch to the first work position, the second reversing valve to switch to the first work position, and the switch valve to maintain the closed position, so as to drive the front wheels and the rear wheels to steer in the first direction simultaneously; and in a four-wheel steering mode, controlling the first reversing valve to switch to the second work position, the second reversing valve to switch to the second work position, and the switch valve to maintain the closed position, so as to drive the front wheels to steer in the second direction and the rear wheels to steer in the first direction simultaneously; or controlling the first reversing valve to switch to the first work position, the second reversing valve to switch to the second work position, and the switch valve to maintain the closed position, so as to drive the front wheels to steer in the first direction and the rear wheels to steer in the second direction simultaneously.

8. The control method of claim 6, wherein a controller is configured to receive a first detection signal from the first detection member and control steering of the front wheels according to the first detection signal so that the front wheels are centered; and receive a second detection signal from the second detection member and control steering of the rear wheels according to the second detection signal so that the rear wheels are centered.

9. The control method of claim 8, wherein detecting the position states of the front wheels and the rear wheels respectively comprises determining and recording the position states of the front wheels according to the steering of the front wheels performed when the first signal and the second signal output by the first detection member are switched; and determining and recording the position states of the rear wheels according to the steering of the rear wheels performed when the first signal and the second signal output by the second detection member are switched.

10. The control method of claim 7, wherein a controller is configured to receive a first detection signal from the first detection member and control steering of the front wheels according to the first detection signal so that the front wheels are centered; and receive a second detection signal from the second detection member and control steering of the rear wheels according to the second detection signal so that the rear wheels are centered.

11. The control method of claim 10, wherein detecting the position states of the front wheels and the rear wheels respectively comprises determining and recording the position states of the front wheels according to the steering of the front wheels performed when the first signal and the second signal output by the first detection member are switched; and determining and recording the position states of the rear wheels according to the steering of the rear wheels performed when the first signal and the second signal output by the second detection member are switched.

\* \* \* \* \*